(12) United States Patent
Baumert et al.

(10) Patent No.: US 7,499,860 B2
(45) Date of Patent: Mar. 3, 2009

(54) COMPUTER SYSTEM AND METHOD FOR ENHANCING EXPERIENCE USING NETWORKED DEVICES

(75) Inventors: David William Baumert, Sammamish, WA (US); Jonathan C. Cluts, Sammamish, WA (US); Pamela J. Heath, Seattle, WA (US); Flora Goldthwaite, Seattle, WA (US); Aaron Woodman, Seattle, WA (US); Immaneni Ashok, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 10/321,811

(22) Filed: Dec. 17, 2002

(65) Prior Publication Data

US 2004/0117190 A1    Jun. 17, 2004

(51) Int. Cl.
*G10L 11/00* (2006.01)
*G10L 21/00* (2006.01)

(52) U.S. Cl. ...................... 704/275; 704/270
(58) Field of Classification Search .......... 704/270–275
See application file for complete search history.

(56) References Cited

U.S. PATENT DOCUMENTS

| | | | | |
|---|---|---|---|---|
| 4,305,131 | A * | 12/1981 | Best ........................... | 715/716 |
| 4,333,152 | A * | 6/1982 | Best ........................... | 715/716 |
| 5,481,296 | A * | 1/1996 | Cragun et al. ............... | 725/136 |
| 5,561,457 | A * | 10/1996 | Cragun et al. ............... | 725/137 |
| 5,668,537 | A * | 9/1997 | Chansky et al. ............. | 340/3.7 |
| 5,675,390 | A * | 10/1997 | Schindler et al. ............ | 715/717 |
| 5,794,205 | A * | 8/1998 | Walters et al. .............. | 704/275 |
| 5,848,934 | A * | 12/1998 | Shiels et al. ................. | 463/9 |
| 5,964,064 | A * | 10/1999 | Goddard et al. ............. | 52/8 |
| 6,052,717 | A * | 4/2000 | Reynolds et al. ............ | 709/218 |
| 6,061,056 | A * | 5/2000 | Menard et al. .............. | 715/704 |
| 6,065,010 | A * | 5/2000 | Otsuka et al. ............... | 707/101 |
| 6,067,400 | A * | 5/2000 | Saeki et al. .................. | 386/95 |
| 6,106,399 | A * | 8/2000 | Baker et al. ................. | 463/42 |
| 6,386,985 | B1 * | 5/2002 | Rackham ..................... | 472/75 |
| 6,492,775 | B2 * | 12/2002 | Klotz et al. ................. | 315/120 |
| 6,570,078 | B2 * | 5/2003 | Ludwig ....................... | 84/600 |
| 6,577,080 | B2 * | 6/2003 | Lys et al. .................... | 315/362 |
| 6,696,631 | B2 * | 2/2004 | Smith et al. .................. | 84/645 |
| 6,728,681 | B2 * | 4/2004 | Whitham ..................... | 704/275 |
| 6,785,539 | B2 * | 8/2004 | Hale et al. ............... | 455/422.1 |
| 6,788,983 | B2 * | 9/2004 | Zheng ......................... | 700/94 |

(Continued)

*Primary Examiner*—Patrick N Edouard
*Assistant Examiner*—Eric Yen
(74) *Attorney, Agent, or Firm*—Shook, Hardy & Bacon LLP

(57) ABSTRACT

A computer-implemented system and method is provided for enhancing a user experience within an environment. The experience is enhanced using a number of devices that are connected on a network. The method involves monitoring the environment for cues, such as words from a user reading a book. Upon receiving a cue, one or more of the networked devices are prompted to produce a desired effect that is associated with the cue. The experience of those in the environment is enhanced or augmented by the effects produced. The system of the invention uses a computer that executes a script manager component and a device dispatcher component. The script manager component receives the cues and matches the cue with a desired effect that the network device(s) are to produce. The script manager informs the device dispatcher, which instructs the network devices(s) to produce the desired effect.

11 Claims, 3 Drawing Sheets

U.S. PATENT DOCUMENTS

| | | | |
|---|---|---|---|
| 6,796,908 B2 * | 9/2004 | Weston | 472/43 |
| 6,820,055 B2 * | 11/2004 | Saindon et al. | 704/235 |
| 6,941,268 B2 * | 9/2005 | Porter et al. | 704/270 |
| 7,013,273 B2 * | 3/2006 | Kahn | 704/235 |
| 7,139,617 B1 * | 11/2006 | Morgan et al. | 700/17 |
| 2002/0007723 A1 * | 1/2002 | Ludwig | 84/645 |

* cited by examiner

COMPUTER SYSTEM AND METHOD FOR ENHANCING EXPERIENCE USING NETWORKED DEVICES

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates generally to computer software, and more particularly, to a system and method for enhancing a user experience using networked devices, based on audio cues.

BACKGROUND OF THE INVENTION

Voice or audio activated devices are by now well-known in a number of different environments. For example, devices that turn on and off with a simple clap have been used for some time. Additionally, devices such as toys that perform certain functions upon receiving a specific audio command also exist. But these devices act in isolation and not in concert. As home-computerization evolves, the number of networked devices is slowly increasing. It would be desirable to leverage this network of devices in new, interesting ways. In other words, it would be desirable to utilize these devices in concert using provided cues.

A more specific need exists related to the telling or reading of stories. It would be desirable to increase the interest level of individuals listening to the story. This is especially true as children experience interactive toys, computer games and so on. To some of these children, simply listening to a story can be boring. By providing enhancements to the storytelling process, the story can come alive and involve the listener. It would therefore be desirable to utilize available networked devices to provide an enhanced experience to the listener or other individual.

A new system and method is needed that addresses the above-noted problems. The system and method should increase the interest level of individuals participating in the experience and should take advantage of the devices on the network in new and interesting ways.

BRIEF SUMMARY OF THE INVENTION

This invention is directed to a computer-implemented system and method for enhancing a user experience within an environment, such as the room of a house. The experience is enhanced using a number of devices that are connected on a network. The method involves monitoring the environment for cues, such as words from a user reading a book. Upon receiving a cue, one or more of the networked devices are prompted to produce a desired effect that is associated with the cue. Using the method, the experience of those in the environment is enhanced or augmented by the effects produced by the networked devices. The effects are triggered by the cues.

The system is also used to enhance a user experience within an environment, where the environment is equipped with a number of networked devices capable of producing any of a number of effects. The system uses a computer that executes a script manager component and a device dispatcher component. The script manager component receives the cues and matches the cue with a desired effect that the network device(s) are to produce. The script manager informs the device dispatcher, which instructs the network devices(s) to produce the desired effect. The script manager continues to monitor for and receive cues until an end command or the last cue is received. Using the enhanced experience method and system of the invention, individuals can take advantage of the devices existing on the network in new and exciting ways.

Additional advantages and novel features of the invention will be set forth in the description which follows, and in part will become apparent to those skilled in the art upon examination of the following, or may be learned from practice of the invention.

BRIEF DESCRIPTION OF THE SEVERAL VIEWS OF THE DRAWING

These and other objectives and advantages of the present invention will be more readily apparent from the following detailed description of the drawings of the preferred embodiment of the invention that are herein incorporated by reference and in which.

DETAILED DESCRIPTION OF THE INVENTION

The present invention provides a computer-implemented system and method for enhancing the experience of individuals using networked devices. The system monitors for cues from the environment. For example, a speech recognizer engine is used to receive audio cues from one or more users. The audio cues are mapped to effects that can be provided by the networked devices. When an audio cue that has a corresponding effect is received, the system dispatches a command to trigger the effect. The system continues to "listen" for audio cues until an ending command is received, at which point the networked devices revert to more traditional functioning.

Having briefly described an embodiment of the present invention, an exemplary operating environment for the present invention is described below.

Exemplary Operating Environment

Figure 1:
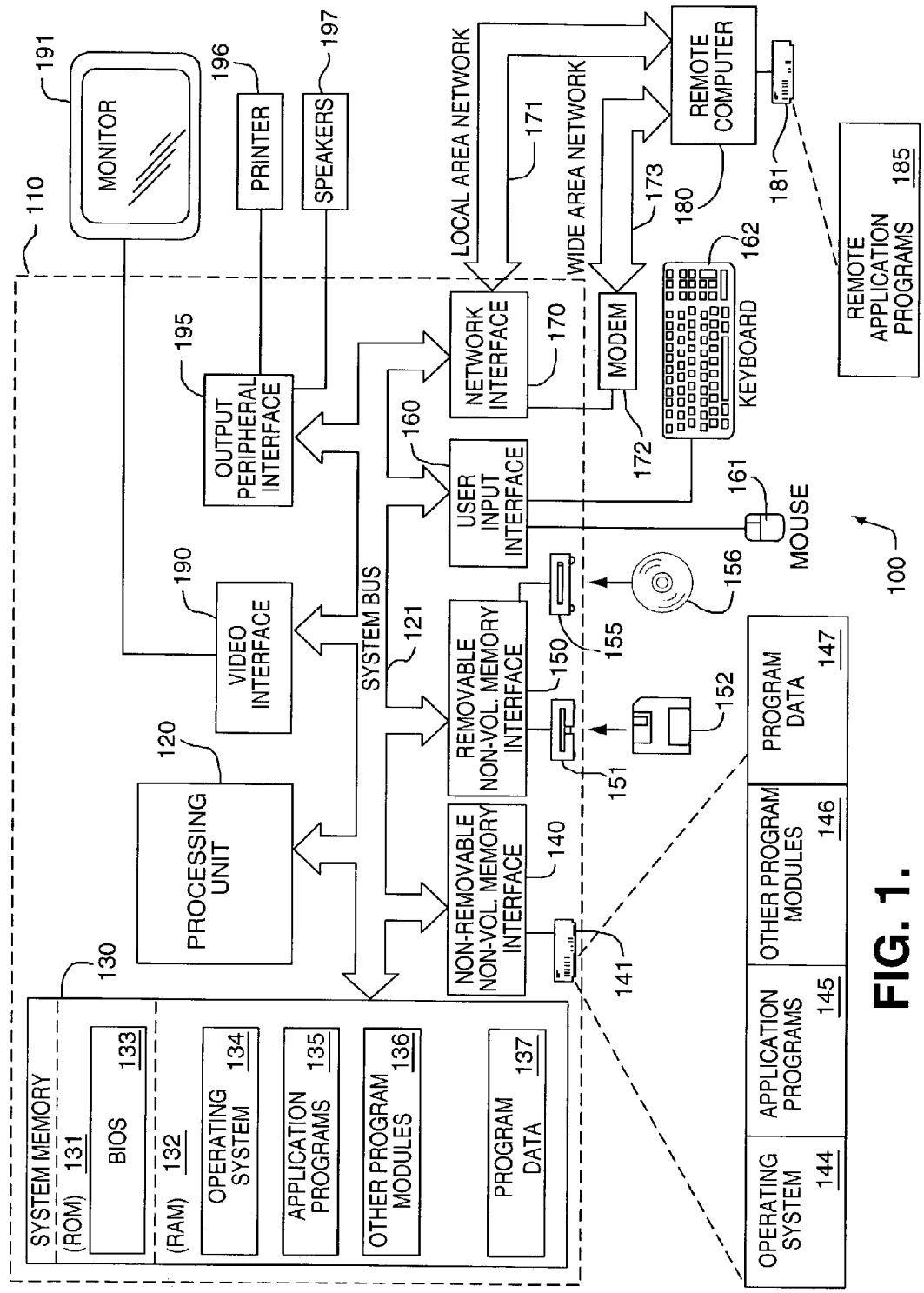
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Enhanced Experience System

The enhanced experience system of the present invention is used to provide users and other participants with an effect-enhanced experience, using devices that are connected on a network. The initial discussion will focus on the basic components of the system and their use and a specific example is discussed with reference to FIG. 3. It should be understood that the example is merely one possible use of the inventive system and method and that the example is not intended to be limiting in any way.

Figure 2:
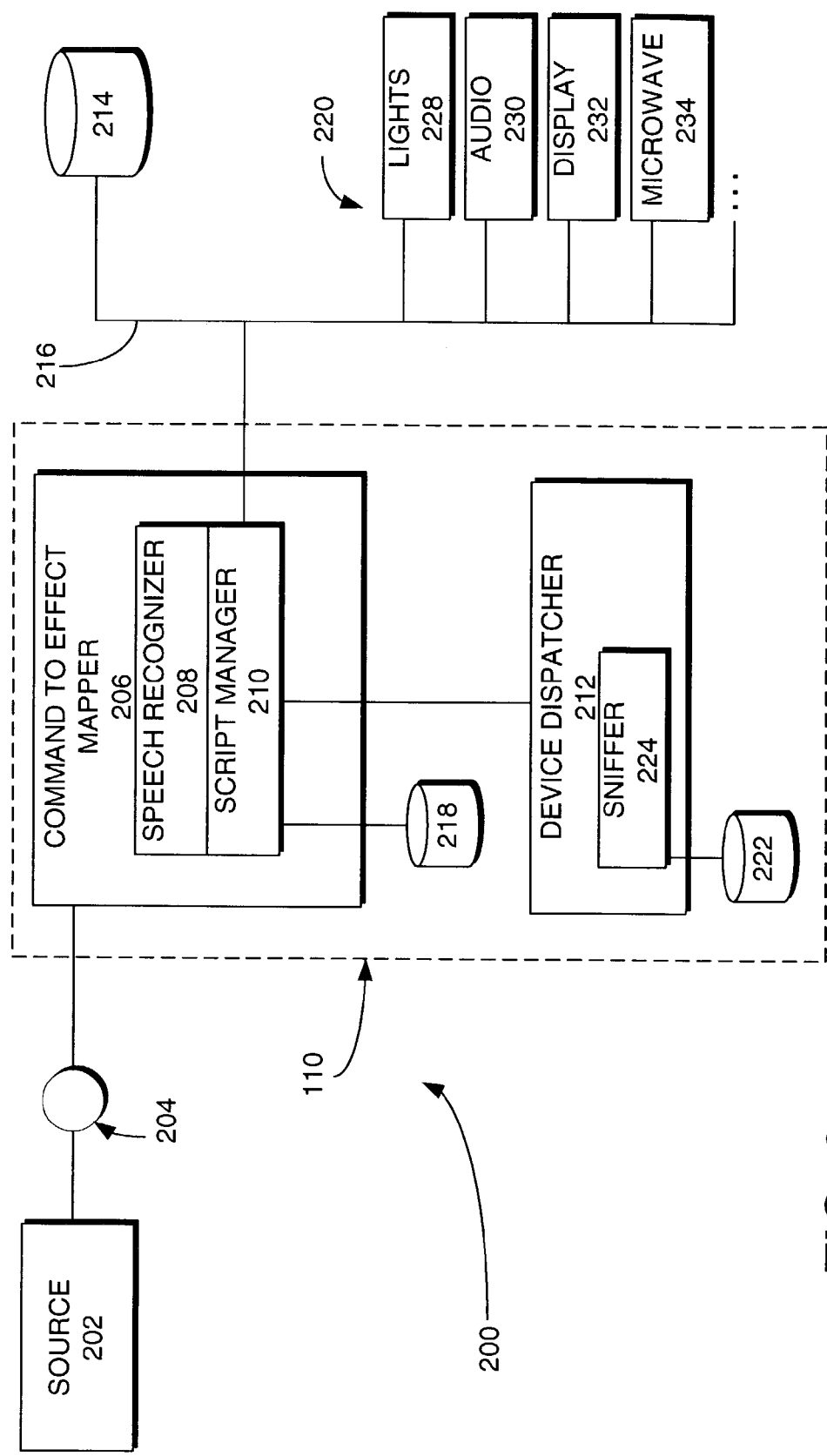
FIG. 2 is a schematic block diagram representing the basic components of the present invention.

An experience-enhancing system 200 incorporating the basic features of the present invention is shown schematically in FIG. 2. The system monitors for and receives cues from a source 202. The cue can be an audio cue, such as the words of a story. The cue could also be another type of indicator, such as movement with the environment, in a system equipped with machine vision. As an example, source 202 can simply be a person reading a book out loud or speaking. To monitor for the audio cues, a receiving device 204 is provided. Receiving device 204 is typically some type of microphone. As an example, receiving device 204 can be a hand-held microphone, a wireless microphone or an array microphone. It should be understood that other receiving devices, such a video receiving device, are within the scope of the present invention. The receiving device 204 communicates with the computing environment 100, and more specifically with computer 110. Computer 110 includes a command-to-effect mapper component 206.

Mapper 206 receives input from the receiving device 204 and, based upon the input received, determines what effects, if any, are to be generated. Mapper 206 includes a speech recognizer component 208 and a script manager 210. Any of a number of known speech recognizer engines are suitable for use in the present invention. For example, a speech recognizer available from the Microsoft Corporation of Redmond, Washington under the SDK 5.1 is suitable for use as speech recognizer 208. Broadly stated, the speech recognizer is capable of recognizing words that are spoken out loud. Script manager 210 looks for recognized and available scripts and is responsible for directing a device dispatcher 212, as is more-fully explained below. Script manager 210 is in communication with a script library 214 via a network 216. Script manager 210 is also in communication with a local script library 218 on the computer 110.

Libraries 214 and 218 contain one or more scripts, the use of which is described below. A "script" is a defined table that maps cues to desired effects. The "script" can be designed as a custom script, that maps specifically to a known story and that is created specifically for that story. A number of default scripts can also be provided in libraries 214 and 218. The default scripts can be identified by a scene or category. For example, default scene scripts can be provided for comedies, bedtime stories or campfire stories. A more general default global scene can also be provided that is not otherwise linked to a specific story or category. Moreover, the scripts within libraries 214 and 218 are preferably configurable by the user of the computer so that an available script may be customized by the user.

The device dispatcher 212 is also provided in computer 110. Dispatcher 212 is responsible for receiving commands from script manager 210 to activate one or more devices 220. Dispatcher 212 communicates with an effect library 222. Effect library 222 contains information about the available devices 220 that are on the network 216 as well as the effect(s) that each device 220 is capable of rendering. The effect library 222 may be populated by the user of the system by manually adding devices and their effects. The effect library 222 may also be populated by a sniffer component 224 of dispatcher 212. Sniffer 224 operates to periodically locate available devices on the network and determine the effects that the device is capable of producing.

As best seen in FIG. 2, the dispatcher 212 is coupled to the network 216. Also coupled to the network 216 are a number of devices 220. Example devices shown are color-programmable lights 228, audio player 230, a video display 232 and a microwave 234. It should be understood that any other devices that can be coupled to the network and that are capable of rendering effects are suitable for use in the present invention. The listed devices are exemplary only. As an example of the effects, the lights 228 can display a variety of different colors, the audio player 230 can project sound, the display 232 can display a variety of images and the microwave 234 could render a ding or other sound.

Figure 3:
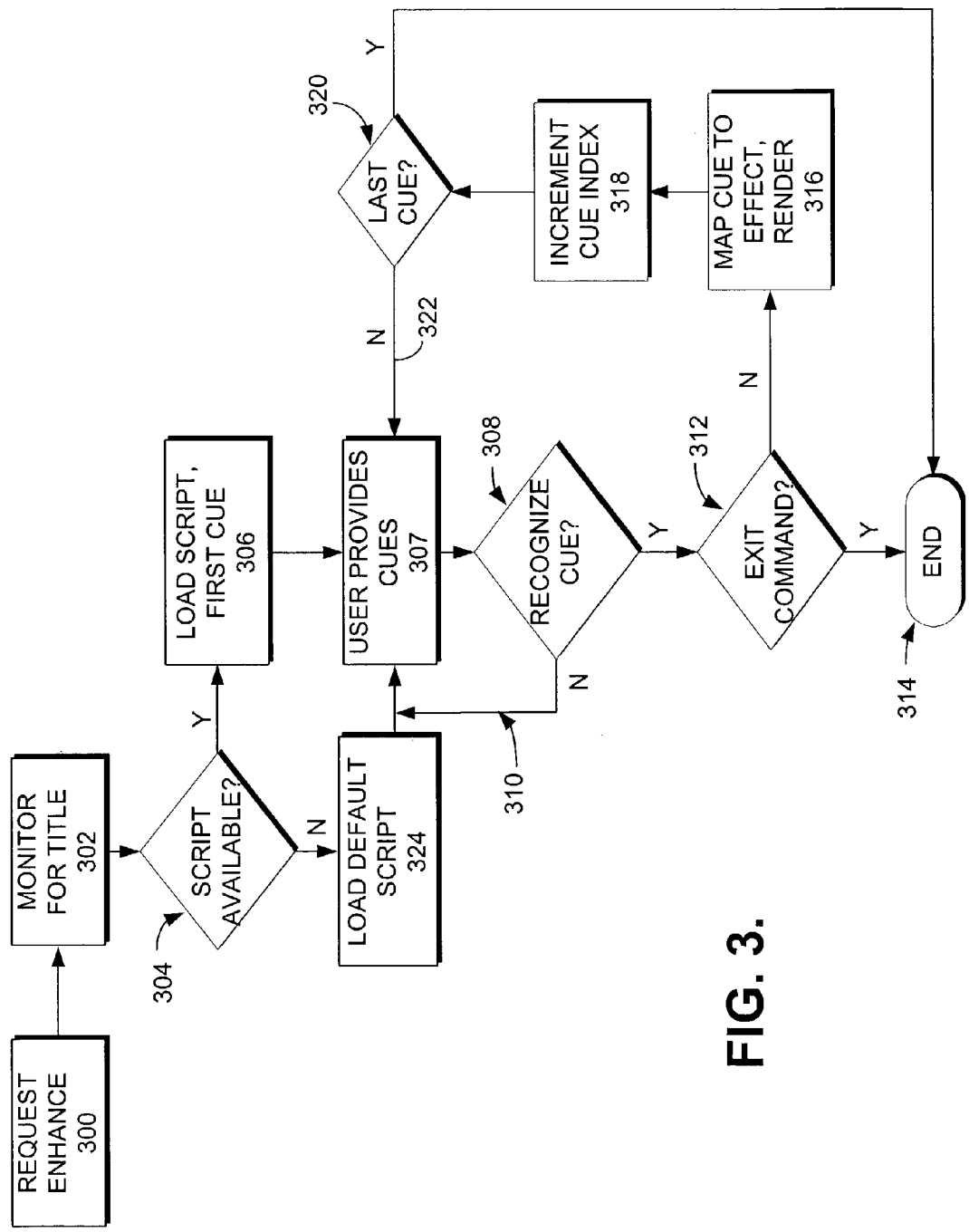
FIG. 3 is a schematic flow diagram representing a method using the present invention.

As an example of a use of the system, the schematic flow chart of FIG. 3 displays the flow of a user reading a story out loud. The process begins with the user indicating a desire for an enhanced experience, as shown at 300. This is accomplished by the user giving an initial audio command that the system is to begin the enhanced experience. For example, the user can give an audio command "MC . . . Enhance Story." The microphone 204 passes this to speech recognizer 208. This audio command is one which begins the enhanced experience. The system then begins to monitor for a title as shown at 302. The user can then state a title, scene or category, if one is preferred. For example, the user can state "Good-night Moon." The speech recognizer 208 communicates this title to script manager 210, which will determine if a script is available for this title within libraries 214 and 218, as shown at step 304.

If a script is available, the script manager 210 loads the script and initializes the system to monitor for the first cue, as shown at 306. The script can be for a specific book title or for a scene or category, such as bedtime story. With the script loaded, the user or source 202 reads the story or otherwise provides cues, as shown at 307. As the user reads the story, the system monitors for the cues within the loaded script. For example, suppose the first audio cue is "dark," as in "It was a dark and stormy night." The system listens for the audio cue "dark." As the user 202 reads the book, the system determines whether any of the words are audio cues, as shown at 308. If no words are recognized cues, the system merely continues, as indicated by the arrow 310. If the audio cue is recognized, the system then determines whether the cue is one that indicates the user desires to end the enhanced experience, as shown at 312. If the cue is one that ends the enhanced experience, the process ends, as shown at 314 and the system will no longer monitor for cues.

If the cue is not one which ends the process, the cue is matched to one or more desired effects by script manager 210, as shown at 316. The script manager 210 then directs the device dispatcher 212 to instruct the proper device(s) 220 to render or produce the desired effect. For example, upon receiving the audio cue "dark," the script may indicate that this audio cue is mapped to the effect of dimming the lights. Device dispatcher 212, in this example, would instruct lights 228 to dim. The effect of lightning could also be produced by instructing lights 228 to flash periodically. After the effect is produced, script manager 210 increments the cue index of the script by one, as shown at 318. If a script was found and loaded, the process continues by determining if the cue was the last one, as shown at 320. If it was the last cue, the process ends, as shown at 314. If the cue was not the last cue, the process continues to monitor for other cues, as indicated by the arrow 322. This iterative process continues until the user indicates that he or she desires to end the enhanced experience or the last cue is received. In this way, the user experience is enhanced. In this specific example, the story is enhanced for all as the user reads the book. Any device 220 on the network can be used as an effect-producing device. Audio can be provided, such as the sounds of a storm, an owl or any other audio effect. Video displays can be used. The number of effects is virtually limitless and depends on the type and number of devices that are connected to the network.

Returning to step 304, if the title is not given or if it is not one for which a script is available, the script manager loads the general default script, as shown at 324. The general default script will preferably contain some predetermined effects that are mapped to cues. For example, the word "green" can be an audio cue that the lights 228 are to be displayed in a green color, or the word "storm" can be an audio cue that the audio system is to produce a rumbling sound. As with the provided scripts, the possible effects and cues are virtually limitless. With the default script loaded, the system monitors for cues as described above, until the user indicates the desire to end the enhanced experience.

As can be seen, the system and method of the present invention allow for new uses of devices existing on a network. These devices can be used to programmatically produce a wide variety of desired effects. These desired effects can be used to enhance any experience where cues can be given. In the basic example, an enhanced storytelling experience can be provided to produce an effect-laden environment that corresponds to the story. This makes the listening experience more enjoyable and interesting. Other experiences can also be enhanced, such as a skit, play or sing-along song.

The system and method described above take advantage of any of a number of devices that are connected on the network. Any number of different experiences can be enhanced by informing the system that an enhanced experience is desired. Cues are then provided to the system, with each cue resulting in one or more effects provided by one or more of the devices on the network.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and within the scope of the claims.

What is claimed is:

1. A computer-implemented method for enhancing a user experience within a storytelling environment using effects provided by a plurality of network devices, comprising:
   continuously monitoring the storytelling environment for one or more storytelling cues, wherein the storytelling environment is a room in which one and only one person is telling a fixed-plot story, wherein the storytelling cues are audio cues spoken by the person in association with the narration of the story, and wherein the storytelling cues generate an enhancement of the storytelling environment; and
   upon receiving a storytelling cue commanding one or more of the networked devices to produce one or more effects corresponding to the received storytelling cue wherein the networked devices operate in a local area network (LAN), a wide area network (WAN), or a packet area network, and wherein the networked devices are located within the storytelling environment,
   wherein, the environment is initially monitored for an indication that an enhanced user experience is desired and, upon receiving the indication, monitoring for an enhanced experience title and, upon receiving the enhanced title, determining that a script pairing specified cues to specified device-produced effects is present and using the script to provide the enhanced experience.

2. The computer-implemented method of claim 1, wherein the audio cues are words that are part of a story.

3. The computer-implemented method of claim 1, wherein the enhanced experience title is a book title.

4. The computer-implemented method of claim 1, wherein the enhanced experience title is a scene or category.

5. The computer-implemented method of claim 1, further comprising, incrementing the script after each occurrence of receiving a storytelling cue.

6. The computer-implemented method of claim 5, further comprising, continuing the monitoring for storytelling cues until the last cue is received or until an ending command is received.

7. A system for enhancing a user experience within a storytelling environment having a number of networked devices, comprising:
   a computer having a memory;
   a script manager component executable on the computer to continuously monitor for storytelling cues, receive storytelling cues, and determine, based on the received storytelling cue, a desired associated enhancing effect to be produced by one or more of the networked devices wherein the networked devices operate in a local area network (LAN), a wide area network (WAN), or a packet area network, wherein the desired associated enhancing effect is configured to enhance the storytelling environment, wherein the storytelling environment is a room in which one and only one person is telling a fixed-plot story, and wherein the storytelling cue is an audio cue spoken by the person in association with the fixed-plot story;
   a device dispatcher component that receives instructions from the script manager for issuing commands to one or more of the networked devices to produce one or more effects associated with the cue;
   one or more script libraries in communication with the script manager, the one or more script libraries containing pre-determined scripts matching a sequence of cues to a corresponding sequence of effects to be produced by the networked devices wherein the one or more script libraries are one or more storage devices;
   an effect library in communication with the device dispatcher, the effect library containing the effect capabilities of each of the devices on the network; and
   a sniffer component associated with the device dispatcher, the sniffer component polling the network for devices and determining the effect producing capabilities of found devices.

8. A computer readable medium containing instructions for enhancing a user experience within a storytelling environment using effects provided by a plurality of network devices, the instructions comprising:
   continuously monitoring the environment for one or more storytelling cues, wherein the storytelling environment is a room in which one and only one person is telling a fixed-plot story, wherein the storytelling cues are audio cues spoken by the person in association with the narration of a story, and wherein the storytelling cues generate an enhancement of the storytelling environment; and
   upon receiving a storytelling cue, generating an enhancement of the storytelling environment by issuing a command to one or more of the networked devices to produce one or more effects corresponding to the received storytelling cue wherein the networked devices operate in a local area network (LAN), a wide area network (WAN), or a packet area network, wherein the one or more effects enhance the storytelling environment, and wherein the storytelling environment has a fixed plot,
   wherein, the environment is initially monitored for an indication that an enhanced user experience is desired and, upon receiving the indication, monitoring for an enhanced experience title and, upon receiving the enhanced title, determining that a custom script specific to a particular story pairing specified cues to specified device-produced effects for the particular story is present and using the script to provide the enhanced experience.

9. The computer readable medium of claim 8, wherein the storytelling cues are audio cues that are stored as a collection with corresponding effects.

10. The computer readable medium of claim 9, further comprising instructions for incrementing the script after each occurrence of receiving a storytelling cue.

11. The computer readable medium of claim 10, further comprising instructions for continuing the monitoring for storytelling cues until the last cue is received or until an ending command is received.

* * * * *